Sept. 25, 1923.

A. P. WOLFE

RADIATOR FOR MOTOR VEHICLES

Filed Sept. 27, 1920  2 Sheets-Sheet 1

1,468,686

Inventor
Arthur P. Wolfe, by
T. A. Witherspoon
Attorney.

Sept. 25, 1923.  
A. P. WOLFE  
RADIATOR FOR MOTOR VEHICLES  
Filed Sept. 27, 1920  
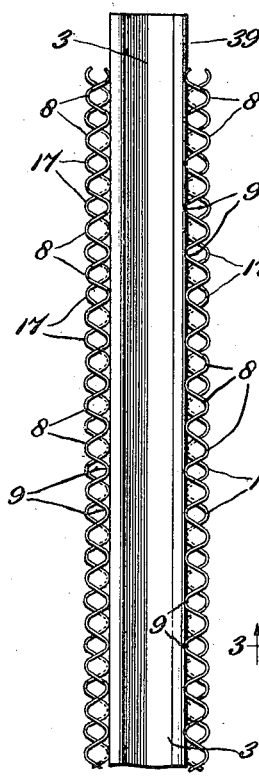
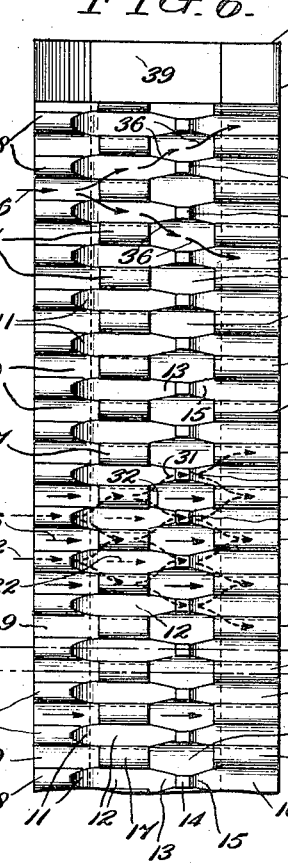
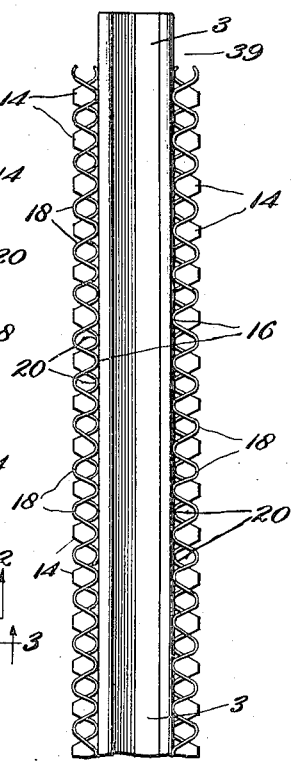
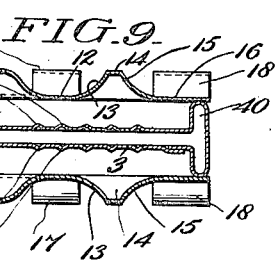
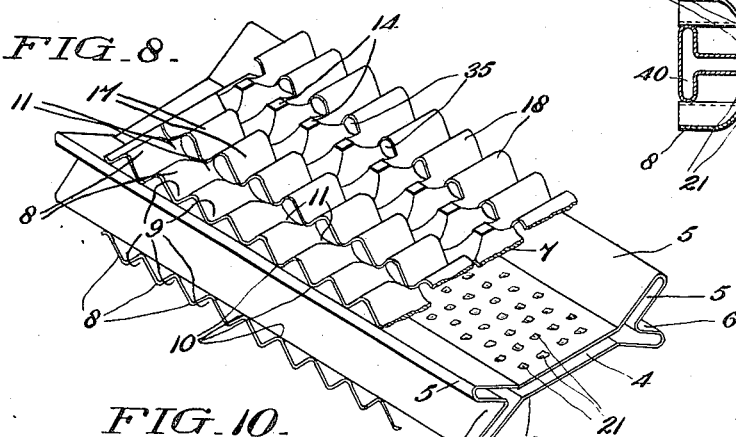
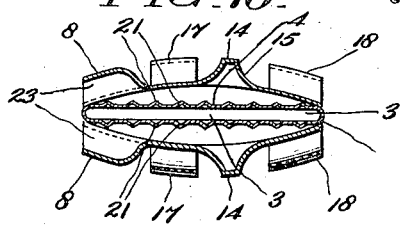
INVENTOR  
Arthur P. Wolfe, by  
T. G. Witherspoon  
ATTORNEY Patented Sept. 25, 1923.

1,468,686

UNITED STATES PATENT OFFICE.

ARTHUR P. WOLFE, OF PHILADELPHIA, PENNSYLVANIA.

RADIATOR FOR MOTOR VEHICLES.

Application filed September 27, 1920. Serial No. 413,023.

*To all whom it may concern:*

Be it known that I, ARTHUR P. WOLFE, a citizen of the United States, residing at Philadelphia, in the county of Philadelphia and State of Pennsylvania, have invented certain new and useful Improvements in Radiators for Motor Vehicles; and I do hereby declare the following to be a full, clear, and exact description of the invention, such as will enable others skilled in the art to which it appertains to make and use the same.

This invention relates to radiators for motor vehicles and has for its object to provide a construction which will be comparatively less expensive to construct and more efficient in action than those which have been heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:

Figure 5 is an edge elevational view of a water tube removed from the radiator;

Figure 6 is a side elevational view of the parts shown in Figure 5;

Figure 7 is a view similar to Figure 5 illustrating the opposite edge of the water tube;

Figure 8 is a perspective view partially broken away of the parts shown in Figure 6;

Figure 9 is a sectional view similar to Figure 2 of a somewhat modified form of construction; and Figure 10 is a view similar to Figure 9 of a still further modified form of construction.

Figure 1:
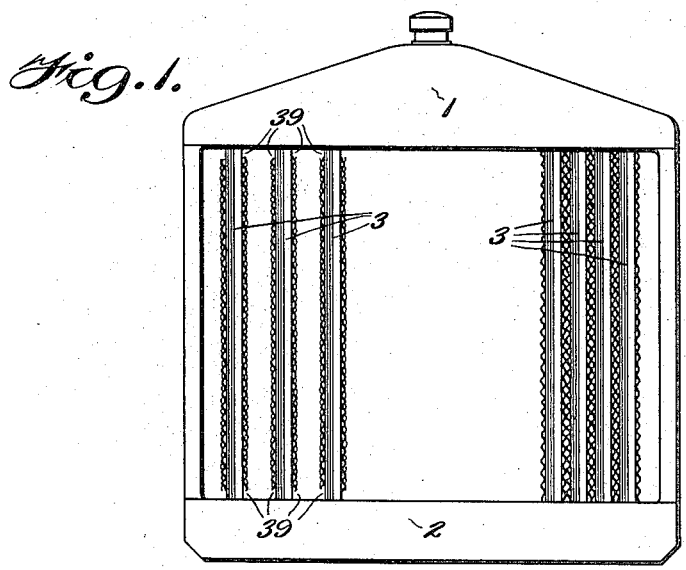
Figure 1 is a diagrammatic front elevational view of a radiator provided with this invention.

1 indicates the upper tank of a radiator for motor vehicles; 2 the lower tank thereof; and 3 a plurality of water tubes extending between the tanks 1 and 2 in the usual manner. The tubes 3 are preferably of the cross section shown in Fig. 2, having the parallel sides 4 in its main body portion, and the angularly disposed members 5 at each edge extending longitudinally of the main body portion and forming the outer air channels 6 as shown. Extending from edge to edge of the extensions or members 5 on each side of the water tubes and resting on the members 5, are the corrugated plates 7 as illustrated. Said plates 7 are provided with the raised portions 8 on one edge separated by the depressions 9, which touch the channel members 5 at the points 10 as illustrated. Said raised portions 8 are slanted or sloped off to form the portions 11, terminating in the flatter portions 12 which join the curved portions 13, terminating in the dome or flat portions 14, while said portions 14 slope off into the curved portions 15 similar to the portions 11 and the latter portions terminate in the flat or depressed portions 16 of the plate, all as will be clear from Figures 2 and 9 of the drawings. On each side of a given flat portion 12 is a raised or corrugated portion 17 which is located between the domes 14 and the raised portions 8, and which constitute a row of open ended corrugations spaced between said members 8 and 14, and staggered in relation thereto, as best illustrated in Figure 6. In the same way on each side of a given flat portion 16 is disposed open ended corrugations 18 which constitute another row of corrugations extending along the length of the tube and which are staggered in relation to the said members 8 and 14.

Between the domes 14 there is provided the depressions 20 which constitute a channel way between the corrugations 17 and 18.

Figure 2:
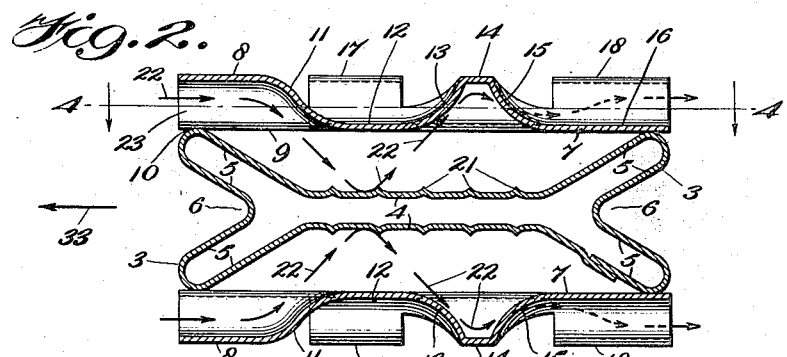
Figure 2 is an enlarged sectional view of one of the water tubes and ventiducts taken on the line 2—2 of Figure 6 looking in the direction of the arrows.
Figure 4:
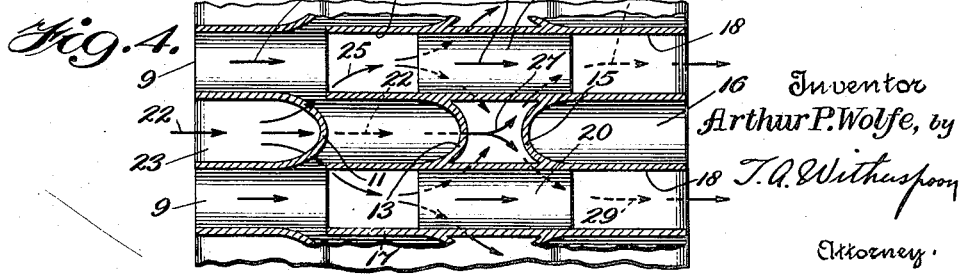
Figure 4 is a sectional view taken on the line 4—4 of Figure 2 looking in the direction of the arrows.

The parallel channel portions 4 of the tubes 3 are provided with numerous fine points or heat radiating projections 21 so that a current of air indicated by the arrows 22 entering an opening 23 of a projection 8 will be deflected by the curved portion 11, down into contact with said projections 21 and thus will absorb an increased quantity of heat. Said currents of air 22 will likewise be deflected upwardly against the inner surfaces of the curved portion 13 of the dome 14, as best illustrated in Figure 2, whereupon the curved portion 15 of said dome 14 will cause said air to divide as at the point 27 and a portion 28 thereof to escape through one corrugation 18, while another portion 29 thereof will escape through an adjacent corrugation 18 on the opposite side of a depression 16, all as will be clear from the arrows illustrated in Figures 2, 4, and 6. In the same way another portion 25 of the air current 22 will be deflected to one side by the curved portion 11 and find its way into an adjacent corrugation 17 where it will join with the current of air 26 entering said corrugation 17 over a depressed portion 9 and the two currents of air thus formed will proceed through the corrugation 17 over the space or channel 20, as is indicated by the arrow 30 in Figure 4. From the channel 20 the currents of air thus produced will proceed through the corrugations 18 and will join with the currents 28 heretofore mentioned.

In addition to this, the air currents 26 passing over the depressions 9 and passing into the corrugations 17 will be deflected laterally of the tubes 3 as indicated by the arrows 31 and 32 in Figure 6. They will thereupon join with the currents of air 22 already in the domes 14 above described, and will intermingle with the other currents of air present.

Figure 3:
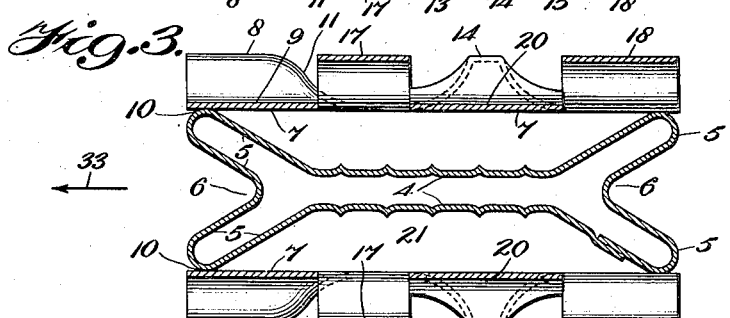
Figure 3 is a view similar to Figure 2 taken on the line 3—3 of Figure 6 looking in the direction of the arrows.

Stated in other language, it is very clear that if we suppose the vehicle to be traveling in the direction of the arrows 33 in Figures 2 and 3 air entering the corrugations 8 will be deflected laterally of the tubes 3 and against the heat radiating projections 21, all as above stated. In the same way air entering the corrugations 17 over the depressions 9 will likewise be deflected laterally of said tubes 3 and thrown into contact with said heat radiating depressions 21.

Again, air entering the corrugations 18 will pass through the openings 35, will join the air already in said corrugations, and serve to cool the tubes 3 by contact with the channel members 5, all as will be clear from the drawings.

In addition to this, what might be termed "internal air," there will be a considerable portion of external air which will wind in and out among the corrugations 8, 17, and 18, balloting against the domes 14 and the depressions 9, 16, etc. This said last mentioned air is illustrated diagrammatically by the arrows 36, Figure 6, and it serves still further to cool the parts and to keep up the pressure of the air against the radiating projections 21.

If we now analyze the action of the air just described, and if we will look at a tube from the left hand side as seen in Figures 2 and 6 we will observe that there are three projections or corrugations 8, 17, and 18, which serve to conduct the air over the tube 3 to the right hand side thereof. On the other hand, the fan, not shown, which is customarily used in motor vehicles will be located on the right hand side of said tube and will be constantly sucking air into the space there found, so that the air entering said space must find an outlet. Now, on looking at the said tube 3 and the above mentioned corrugations from its right hand edge, as seen in Figures 2 and 6, we will observe at once that there are only the corrugations 18 and 17 to conduct the air away. In other words, air which enters the corrugations 8 as indicated by the arrows 22 is caught by the dome shaped members 14 and is deflected on each side through the corrugations 18, which are already supplied by the corrugations 17, and therefore when said air reverses its motion a greater or less resistance is encountered in the corrugations 18. It results that there is a greater facility for the air to pass from left to right than there is for it to pass from right to left as seen in Figures 2 and 6. This construction just described, therefore, serves to facilitate the lateral movement of the air on the outside of and up and down or lengthwise of the tube 3. In practice it is found that this lateral movement is very considerable indeed and that, therefore, the said corrugations just mentioned which together with the tube 3, I prefer to call ventiducts, are terminated short of the extreme end 38 of the tubes 3 so as to leave a considerable space 39 between said ends and the ends of the corrugations, all as will be clear from figures 5, 6, and 7.

In addition to this forcing of the air to travel longitudinally of the tube, and in addition to the forcible deflection of the air to cross the tube by the disposition of the corrugations described above, these said heat radiating projections 21 serve to impede lateral motion of the air along the tubes and thus to make its passage more turbulent than would otherwise be the case.

Stated in other language the construction just disclosed enables me to obtain a large tube surface in contact with a relatively small bulk of water, and to provide a very large corrugated ventiduct surface connected with the water tube surface and to so position the various parts that there is formed three distinctive tubes. One of said tubes is the water passage tube 3, and the other two tubes are the vented air passage tubes between a pair of corrugated plates 7 and said water passage tube 3. It results therefore from the construction just described that I provide in each instance a compound tube which is independent in its action of the position of other similar compound tubes that are adjacent to it, in so far as the deflection of air to the surface of the water passage tube is concerned. Although, of course, by placing two independent tubes in close juxtaposition I form between their contacting corrugated surfaces additional air passages such as are illustrated by the arrows 36 in Figure 6.

It will now be clear that by the construction disclosed I employ a relatively small resistance to the transverse passage of the cool air while I give said air a very considerable whirling or turbulent motion so that it becomes thoroughly mixed during its passage transversely of the tubes 3 and it becomes violently deflected against said tubes at every point of its passage and throughout their entire length, although the draft of the air suction fan, not shown, will not cover the entire length of said tubes. The result is that the entire volume of the air is practically of the same temperature throughout and all superheated stratas and columns of air that are frequently found in other cooling apparatus employing separate air passages are avoided.

In the somewhat modified form of the invention illustrated in Figure 9, the operation and construction is substantially the same as that heretofore disclosed, except that the cross section of the tube 3 is of an I-shape instead of the shape shown in Figure 8. The I is formed by making the members 5 of Figure 8 upright to form the members 40 as shown. Otherwise, the construction and operation is, or may be, the same as that disclosed above.

In a still further modified form of the invention illustrated in Figure 10, the tube 3 is formed flat throughout so that neither of the members 5 nor 40 appear therein.

It will now be clear that each of the water tubes 3 and their associated corrugations constitute a construction which consists essentially of both a water tube and self-contained heat radiating fins combined with air tubes on each side of the water tube extending lengthwise thereof. Not only this, but in all the forms except those illustrated in Figures 9 and 10 there is an additional air channel 6 along which air passes and which serve to produce a very considerable cooling effect.

It is an important feature of the invention that the ventiduct plates in each radiator unit consisting of a tube and a pair of said plates 7 are so formed that all currents of air crossing a given tube must have a portion thereof deflected longitudinally of the tube and a portion thereof deflected transversely of the tube and of the line of travel of said air as is best shown in Figs. 2 and 6. This invention is especially adapted for use on motor trucks.

It is obvious that those skilled in the art may vary the details of construction as well as the arrangement of parts without departing from the spirit of the invention, and therefore I do not wish to be limited to the above disclosure except as may be required by the claims.

What I claim is:

1. In a radiator the combination of a water tube comprising a flattened portion and angularly disposed extensions at each edge thereof; and a corrugated plate of sheet material secured to the exterior of said tube and spaced therefrom to form an air passage extending longitudinally of said tube, substantially as described.

2. In a radiator the combination of a water tube having a flat like cross section and angularly disposed extensions running longitudinally of said tube at each side; and a pair of corrugated plates rigid with the outside of said tube and forming with the sides thereof air passages disposed longitudinally of said tube, substantially as described.

3. A radiator unit composed of a complete water tube comprising separated angularly disposed extensions running longitudinally of said tube at each side; and heat radiating means rigid therewith on the outside of said tube and forming air passages disposed longitudinally of said tube, substantially as described.

4. In a radiator the combination of a water tube of a flat cross section having a tubular extension at each edge; and a perforated and corrugated sheet associated with said tube and rigid with said extensions to form air passages disposed longitudinally and transversely of said tube, substantially as described.

5. In a radiator the combination of a water tube flat in cross section and having a plurality of angularly disposed tubular extensions at each edge; and a plurality of perforated and corrugated sheets spanning a pair of said extensions on each side of the tube to form longitudinal and transverse air passages, substantially as described.

6. In a radiator the combination of a water tube flat in cross section having a plurality of angularly disposed tubular extensions on each edge forming longitudinally disposed air channels between them; and a perforated and corrugated plate associated with each pair of said extensions to form on the outside of said tube transverse and longitudinal air passages, substantially as described.

7. In a radiator the combination of a flattened water tube; and a plate corrugated transversely with respect to said water tube and spaced therefrom to form on the outside of said tube an uninterrupted air passage disposed longitudinally of said tube and having perforations staggered in relation to each other to form a plurality of air passages disposed transversely of said tube, substantially as described.

8. In a radiator the combination of a flattened water tube having at each side thereof a plurality of longitudinally disposed angular extensions; and a sheet of metal secured thereto and spaced therefrom to form a longitudinally disposed air passage; said sheet provided with a plurality of rows of perforated corrugations staggered in relation to each other, to form a plurality of transverse air passages, substantially as described.

9. In a radiator the combination of a water tube; and a sheet of metal secured thereto and spaced therefrom; said sheet provided with a plurality of rows of perforated corrugations staggered in relation to each other; and a plurality of domes adapted to deflect the air onto said tube; substantially as described.

10. In a radiator the combination of a water tube flat in cross section and having a plurality of tubular extensions and provided with heat radiating projections; and a plurality of perforated and corrugated sheets terminating short of one end of said tube and spanning said extensions to form longitudinal and transverse air passages, substantially as described.

11. In a radiator the combination of a water tube; and a corrugated plate of a shorter length than said tube; said plate spaced therefrom to form a longitudinal air passage and having perforations staggered in relation to each other to form a plurality of transverse air passages; and said tube provided with heat radiating surfaces, substantially as described.

12. In a radiator the combination of a plurality of water tubes each provided with angularly disposed extensions running longitudinally of said tube; a plurality of corrugated sheets associated with each tube and spanning said extensions to form longitudinal air passages on the outsides of said tube; and a water tank with which said tubes are connected, substantially as described.

13. In a radiator the combination of a plurality of flattened water tubes provided with flattened extensions; a plurality of corrugated sheets shorter than and associated with each tube and spaced therefrom on the outside of said tubes to form longitudinal air passages; and a water tank with which said tubes are connected, substantially as described.

14. In a radiator the combination of upper and lower water tanks; a plurality of water tubes connecting said tanks and provided with angularly disposed extensions running longitudinally of said tube; and a plurality of corrugated and perforated plates secured to each extension and spaced from said tubes to form air passages, substantially as described.

In testimony whereof I affix my signature.

ARTHUR P. WOLFE.